US009938196B2

(12) United States Patent
Luczaj et al.

(10) Patent No.: US 9,938,196 B2
(45) Date of Patent: Apr. 10, 2018

(54) METHOD AND A SYSTEM FOR PRODUCING A LIGHTWEIGHT CERAMIC AGGREGATE, PARTICULARLY FROM COAL ASH

(71) Applicant: LSA SP. Z O.O., Bialystok (PL)

(72) Inventors: Krzysztof Luczaj, Bialystok (PL);
Janusz Sokolowski, Warsaw (PL);
Krzysztof Jan Switka, Bialystok (PL);
Michal Kabacinski, Susz (PL)

(73) Assignee: LSA SP. Z O.O., Bialystok (PL)

( * ) Notice: Subject to any disclaimer, the term of this patent is extended or adjusted under 35 U.S.C. 154(b) by 33 days.

(21) Appl. No.: 15/031,634

(22) PCT Filed: Oct. 23, 2014

(86) PCT No.: PCT/PL2014/000114
§ 371 (c)(1),
(2) Date: Apr. 22, 2016

(87) PCT Pub. No.: WO2015/060735
PCT Pub. Date: Apr. 30, 2015

(65) Prior Publication Data
US 2016/0264473 A1  Sep. 15, 2016

(30) Foreign Application Priority Data

Oct. 23, 2013 (PL) .......................... 405742

(51) Int. Cl.
*C04B 18/02* (2006.01)
*C04B 18/08* (2006.01)
(Continued)

(52) U.S. Cl.
CPC .............. *C04B 35/447* (2013.01); *B02C 7/00* (2013.01); *C04B 18/023* (2013.01); *C04B 35/64* (2013.01);
(Continued)

(58) Field of Classification Search
None
See application file for complete search history.

(56) References Cited

U.S. PATENT DOCUMENTS 2,948,948 A * 8/1960 Duplin, Jr. ................. B01J 2/12
106/DIG. 1
5,057,009 A * 10/1991 Nechvatal ............. C04B 18/027
110/165 A
(Continued)

FOREIGN PATENT DOCUMENTS

DE 3020007 A1 12/1981
EP 0566376 A1 10/1993
(Continued)

OTHER PUBLICATIONS

International Search Report of International Application PCT/PL2014/000114 dated Apr. 13, 2015.
(Continued)

*Primary Examiner* — Mary Lynn F Theisen
(74) *Attorney, Agent, or Firm* — Roberts Mlotkowski Safran Cole & Calderon, P.C.

(57) ABSTRACT

A method for producing a lightweight ceramic aggregate, particularly from coal ash, according to the invention is characterized in that the raw material mixture of the total moisture content preferably below 20% by weight consisting of power station ashes originating from combusting coal, or ashes from combusting coal in a mixture with biomass ash, or ashes from co-combusting biomass with coal and phosphogypsum in an amount of up to 50% by weight, taken from dumps and/or from direct dump from a power station or a heat and power station, the raw materials from the dumps preferably being heated up in winter by a mixture of atmospheric air and exhaust gases from the step of burning and sintering, with a content of non-burnt coal above 6% by weight, agglomeration promoting agents like silty non-
(Continued)

Figure 1:
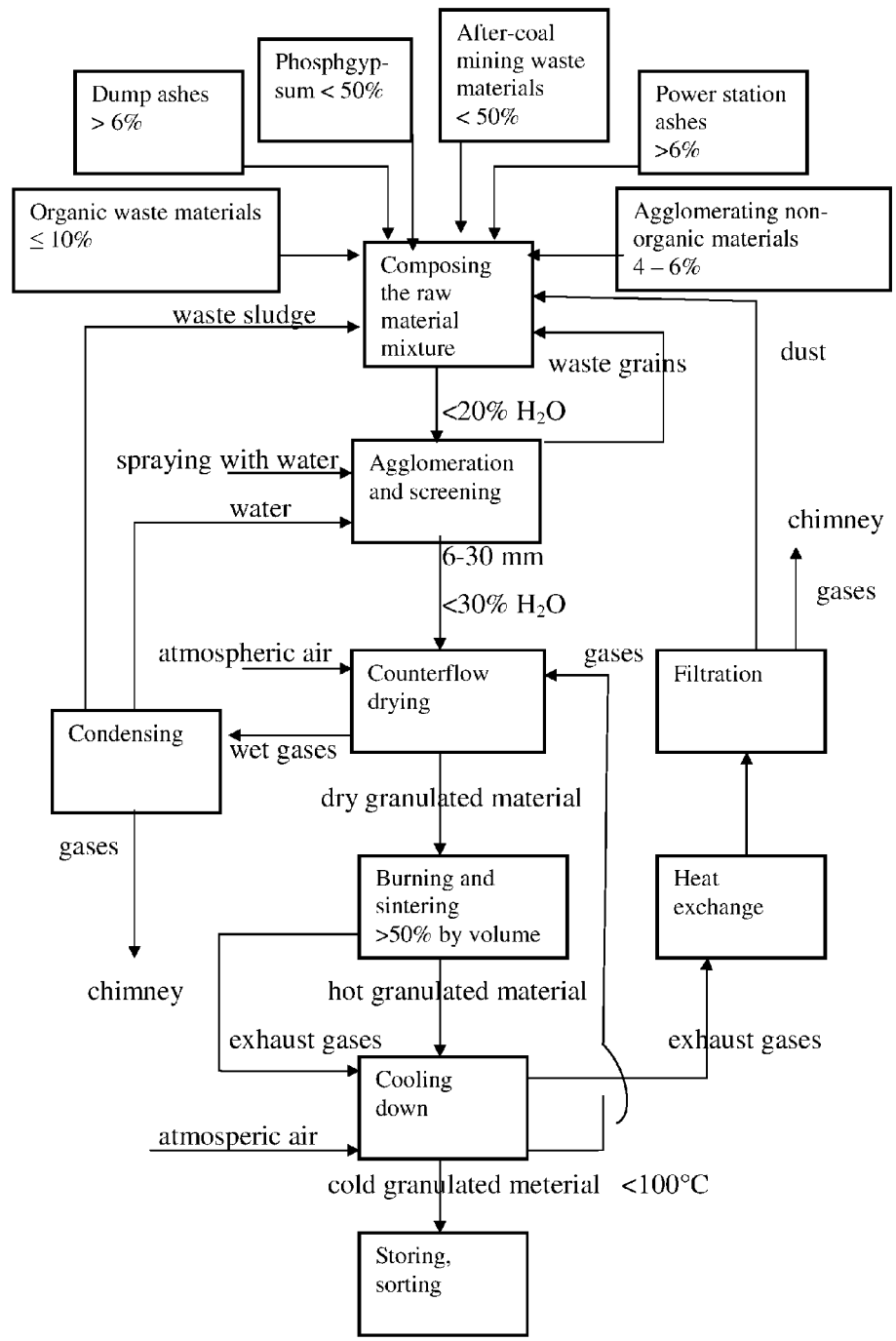

organic materials, preferably bentonite, preferably in an amount of up to 4% by weight, clay preferably up to 6% by weight, organic waste materials like used paints and lacquers, after-fermentation sludge in an amount preferably of up to 10% by weight, and after-coal mining waste materials in an amount preferably of up to 50% by weight, the mixture being completed with dust separated from exhaust gases produced during the step of burning and sintering, is fed to preferably at least one of two or more granulating disks, or in a cascade-type manner to at least two granulating disks, where it is sprayed with water, preferably in a form of a mist, to the total moisture content preferably below 30% by weight. Next, the screened fraction of grains of the granularity of preferably 6-30 mm, is subjected to counterflow drying in the heat of a mixture of the atmospheric air and cooled exhaust gases from the step of burning and sintering, the cooled exhaust gases having the temperature below the ignition temperature of the granulated material. The dried granulated material is subjected to burning and sintering in a co-flow rotary oven with radial air supply, with filling the oven with the granulated material preferably above 50% of its volume without adding any external fuel. Next, the burnt granulated material is subjected to a non-membrane atmospheric air cooling process in a crossed arrangement in a cooling bed, preferably of a transporter or grate type, the cold air being fed to the cooling bed into its specific cooling zone in such an amount that its mixture with the exhaust gases led out from the oven is suitable for drying the granulated material in the drier, for heating up, particularly in the winter, the raw materials taken from the dumps, and for feeding the nozzles radially delivering hot gases into the rotary oven. Finally, the granulated material cooled down preferably to a temperature below 100° C. is transported to the storage yard for the final product, where the aggregate is sorted into trade fractions, round aggregate, and the overgrains, which, after crushing and re-sorting is a crushed aggregate.

A system for producing a lightweight ceramic aggregate, particularly from coal ash according to the invention is characterized in that it is composed of a transporting-sorting device (1) acquiring coal ashes or ashes from combusting coal mixed with biomass ashes, or ashes from co-combusting biomass, coal and phosphogypsum preferably in an amount of up to 50% by weight, from dumps, the device (1) cooperating with an excavator (2), preferably a multibucket excavator, which, by means of a weighting conveyor (3), transfers the batch material to a transporting device, preferably a paddle-type device with a heating functionality, also playing a role of a stirrer and an initial shredder (4), from where the mixture is transported to an intermediate container (5) with a weighting functionality by means of a vertical conveyor, preferably a screw conveyor with a transporting belt without the central shaft, where also the stream of the separated granulated material is directed from granulators (6) as well as the dusts from the dust collector (7), preferably a cyclone, removed from the stream of the gases heating up the batch in the transporting conveyor (4), preferably a paddle conveyor. Further, the mixture of the raw materials is fed, through a magnetic separator (8) of metallic contaminants, two-stage crushing assembly (9), preferably composed of two drum crushers, correspondingly (9.1) and (9.2), and an inter-operation one board relieving screen (9.3), to a stirrer (10), preferably a screw stirrer, preferably a two shaft stirrer, and completed with agglomeration promoting agents taken from storage silos (11) and weighted in the weighting conveyor (12) and then moistened by water supply (13). Further, through a moisture content meter (14), by means of a dosing conveyor (15), preferably a screw conveyor, the mixture enters a system of granulators (6), preferably disk granulators, on the surface of which it is moistened by mist from water nozzles (16), and then, after overflowing over the side walls of the disks of the granulators (6), it is directed to a screen (17), from which overgrains and undergrains are returned to the intermediate container (5), whereas the grains of appropriate size are transported by a distributing conveyor (18) to the highest shelf of the drier (19), preferably a known counterflow drier with movable shelves according to P393175, wherein the drying agent are exhaust gases from the burning and sintering process in the sintering device (21), cooled down by atmospheric air in the cooling bed (20). Further from the drier (19) the grains are led to the chute of the sintering device (21), preferably a known rotary oven according to patent 196842, from where they pour over a pile-up baffle (21A) of the sintering device (21) to the cooling bed (20) and further through the final conveyor (25) to the storage yard (26).

18 Claims, 2 Drawing Sheets

(51) Int. Cl.
| | | |
|---|---|---|
| C04B 18/10 | (2006.01) | |
| C04B 18/12 | (2006.01) | |
| C04B 18/16 | (2006.01) | |
| B01J 2/14 | (2006.01) | |
| C04B 35/447 | (2006.01) | |
| F27B 7/20 | (2006.01) | |
| B02C 7/00 | (2006.01) | |
| C04B 35/64 | (2006.01) | |

(52) U.S. Cl.
CPC ............ *F27B 7/20* (2013.01); *C04B 2235/34* (2013.01); *Y02W 30/92* (2015.05); *Y02W 30/93* (2015.05); *Y02W 30/95* (2015.05); *Y02W 30/96* (2015.05)

(56) References Cited

U.S. PATENT DOCUMENTS

| | | | |
|---|---|---|---|
| 5,669,969 A | 9/1997 | Delbert | |
| 6,334,895 B1* | 1/2002 | Bland | C04B 18/021 106/705 |
| 2006/0162619 A1* | 7/2006 | Bethani | C04B 18/023 106/705 |
| 2011/0173878 A1* | 7/2011 | Jeong | B03B 9/04 44/620 |
| 2012/0167804 A1* | 7/2012 | Perez-Pena | C04B 18/027 106/677 |

FOREIGN PATENT DOCUMENTS

| | | |
|---|---|---|
| EP | 2628715 A2 | 8/2013 |
| PL | 196842 A1 | 12/2003 |
| PL | 398148 A1 | 8/2013 |
| PL | 393175 B1 | 1/2014 |
| WO | 2004/000751 A2 | 12/2003 |
| WO | 2012/078057 A1 | 6/2012 |

OTHER PUBLICATIONS

Written Opinion of International Application PCT/PL2014/000114 dated Apr. 13, 2015.

\* cited by examiner

METHOD AND A SYSTEM FOR PRODUCING A LIGHTWEIGHT CERAMIC AGGREGATE, PARTICULARLY FROM COAL ASH

This invention relates to a power consuming and wasteless method and system for producing a lightweight ceramic aggregate, particularly from coal ash remaining from combustion of coal, with a possibility of replacing a portion of the coal ash with ashes originating from combusting biomass and/or combusting biomass along with coal and phosphogypsum.

There are known technologies for obtaining lightweight ceramic aggregates from natural materials such as gravelite obtained from clay by sintering in a rotary oven or synthetic ceramic aggregates of the type of porous-sintered-ash based on sintered waste ashes, like Lytag, Pollytag, and Corson, from power station ashes sintered on a sintering belt, or Gralit, or according to the technology of the Wisconsin power station, in which the ashes from the coal combustion are sintered in a rotary oven. All these technologies require external energy for producing the ceramic aggregate, although, frequently, a significant amount of non-burnt coal still exists in the ash, particularly if the raw materials are ashes deposited some time ago in dumps. This affects significantly the final price of the product.

In recent years, along with the world-wide tendency to limit the $CO_2$ equivalent emission to the atmosphere, coal combustion power boilers are progressively replaced by boilers adapted to combusting biomass and co-combusting biomass and coal. This generates a new type of power station ashes of decreased content of, inter alia, alumina, and increased amount of alkalies relative to the ash from burning coal, in majority being not suitable to be used as fertilizer due to high concentration of heavy metals including lead. Generally, the ashes contain less than 5% by weight of coal, this involving the necessity of adding some energetic materials, preferably waste ones, for carrying out the burning and sintering processes without adding any external fuel to the sintering device. Such additive may be for example waste technical black.

Phosphogypsum is a raw material that may be used as an agent neutralizing too much alkaline ashes, simultaneously being a component of a ceramic aggregate.

Polish invention No P398148 describes a method for high-temperature, energy saving utilization of phosphogypsum, giving the compositions of the ash-phosphogypsum mixtures and necessary amounts of energetic additives such that to obtain ceramic aggregate of the porous-sintered-ash type in a process of sintering in a rotary oven without any additional external fuel.

Polish invention P393175 describes a counterflow shaft dryer with movable shelves for drying agglomerates of small mechanical strength. It has a vertical, preferably rectangular shaft which has an upper, at least one, preferably two-level uploading zone, several-level, preferably from two to six-level, drying zone, and a bottom, at least one, preferably two-level unloading zone. A connection pipe or an inlet collector for drying gases is situated between the bottom unloading zone and the drying zone. A connection pipe or an outlet collector for wet gases is situated between the drying zone and the upper uploading zone. The shelves of the uploading zone and the shelves of the unloading zone are built from a series of rectangular non-perforated sheets. The shelves of the drying zone are built from a series of rectangular perforated sheets. Each of the rectangular shelf sheets is secured with its longer edge to parallel bolts fixed in a rotary manner to the side walls of the shaft, laterally relative to the axis of the shaft Polish patent 196842 describes a rotary oven for burning and sintering lightweight building aggregate characterized in that a two-diameter drum of the oven consists of a thicker drum portion and a thinner drum portion. The thicker drum portion is closed by an oven head, to which an air duct is delivered whose outlet is situated in the thicker drum portion. The duct feeding the fuel is ended with a burner located within the duct. The oven head is connected to a container and a feeder of raw granulated material. The thinner drum portion closed by the head is connected to the exhaust gases duct. One end of the cooling bed is connected to the head whereas from the air inlet duct goes away a duct delivering air to the collector and then to the slots in the wall of the oven, the slots being arranged at its circumference and situated in the location of burning and sintering the granulated material. This zone extends in regions adjacent to the narrowing of the oven drum, maximally along the whole length of the thicker oven portion and to one fourth of the length of its thinner portion. Preferably, the angle of deflection of the oven axis from the horizontal is bigger than 3.6°.

A method of obtaining lightweight ceramic aggregate, particularly from coal ash, according to the invention, is characterized in that a raw material mixture of the total moisture content preferably below 20% by weight consisting of power station ashes originating from combusting coal, or ashes from combusting coal in a mixture with biomass ash, or ashes from co-combusting biomass with coal and phosphogypsum in an amount of up to 50% by weight, taken from dumps and/or from direct dump from a power station or a heat and power station, the raw materials from the dumps preferably being heated up in winter by a mixture of atmospheric air and exhaust gases from the step of burning and sintering, with a content of non-burnt coal above 6% by weight, agglomeration promoting agents like silty non-organic materials, preferably bentonite, preferably in an amount of up to 4% by weight, clay preferably up to 6% by weight, organic waste materials like used paints and lacquers, after-fermentation sludge in an amount preferably of up to 10% by weight, and after-coal mining waste materials in an amount preferably of up to 50% by weight, the mixture being completed with dust separated from exhaust gases produced during the step of burning and sintering, is fed to preferably at least one of two or more granulating disks, or in a cascade-type manner to at least two granulating disks, where it is sprayed with water, preferably in a form of a mist, to the total moisture content preferably below 30% by weight. Next, the screened fraction of grains of the granularity of preferably 6-30 mm, is subjected to counterflow drying in the heat of a mixture of the atmospheric air and cooled exhaust gases from the step of burning and sintering, the cooled exhaust gases having the temperature below the ignition temperature of the granulated material. The dried granulated material is subjected to burning and sintering in a co-flow rotary oven with radial air supply, with filling the oven with the granulated material preferably above 50% of its volume without adding any external fuel. Next, the burnt granulated material is subjected to a non-membrane atmospheric air cooling process in a crossed arrangement in a cooling bed, preferably of a transporter or grate type. Cold air is fed to the cooling bed into its specific cooling zone in such an amount that its mixture with the exhaust gases led out from the oven is suitable for drying the granulated material in the drier, for heating up, particularly in the winter, the raw materials taken from the dumps, and for feeding the nozzles radially delivering hot gases into the rotary oven. Finally, the granulated material cooled down preferably to a temperature below 100° C. is transported to the storage yard for the final product, where the aggregate is sorted into trade fractions, round aggregate, and the overgrains, which, after crushing and re-sorting is a crushed aggregate.

Preferably, in winter, ashes and/or phosphogypsum from dumps are heated up by a mixture of atmospheric air and exhaust gases from the step of burning and sintering.

The major portion of the hot exhaust gases from the burning and sintering step is fed to a heat exchanger and, after de-dusting in a filter, preferably a cloth filter dust collector, is led out to the chimney, the recovered heat being utilized for external needs, including sanitary, agriculture, industry, and most preferably for producing electric energy.

A system for producing a lightweight ceramic aggregate, particularly from coal ash according to the invention is composed of a transporting-sorting device acquiring coal ashes or ashes from combusting coal mixed with biomass ashes, or ashes from co-combusting biomass, coal and phosphogypsum preferably in an amount of up to 50% by weight, from dumps, the device cooperating with an excavator, preferably a multibucket excavator, which, by means of a weighting conveyor, transfers the batch material to a transporting device, preferably a paddle-type device with a heating functionality, also playing a role of a stirrer and an initial shredder, from where the mixture is transported to an intermediate container with a weighting functionality by means of a vertical conveyor, preferably a screw conveyor with a transporting belt without the central shaft. Also there is directed the stream of the separated granulated material from the granulators as well as the dusts from the dust collector, preferably a cyclone, removed from the stream of the gases heating up the batch in the transporting conveyor, preferably a paddle conveyor. Further, the mixture of the raw materials is fed, through a magnetic separator of metallic contaminants, two-stage crushing assembly, preferably composed of two drum crushers and an inter-operation one board relieving screen, to a stirrer, preferably a screw stirrer, preferably a two shaft stirrer, and completed with agglomeration promoting agents taken from storage silos and weighted in the weighting conveyor and then moistened by water supply. Further, through a moisture content meter, by means of a dosing conveyor, preferably a screw conveyor, the mixture enters a system of granulators, preferably disk granulators, on the surface of which it is moistened by mist from water nozzles. After overflowing over the side walls of the disks of the granulators it is directed to a screen, from which overgrains and undergrains are returned to the intermediate container whereas the grains of appropriate size are transported by a distributing conveyor to the highest shelf of the drier, preferably a known counterflow drier with movable shelves according to P393175, wherein the drying agent are exhaust gases from the burning and sintering process in the sintering device, cooled down by atmospheric air in the cooling bed. Further from the drier the grains are led to the chute of the sintering device, preferably a known rotary oven according to patent 196842, from where they pour over a pile-up baffle of the sintering device to the cooling bed and further through the final conveyor to the storage yard.

From wet, dusty, cold gases leaving the drier water is condensed in a condenser and wholly returned to the process of moistening the raw material mixture in a stirrer, preferably a two-shaft stirrer and to granulators, whereas dusts are separated in the dust collector, also wholly returned to the process and directed through a storage silo to the stirrer, preferably a two-shaft stirrer, whereas the cleaned gases enter the chimney.

Figure 2:
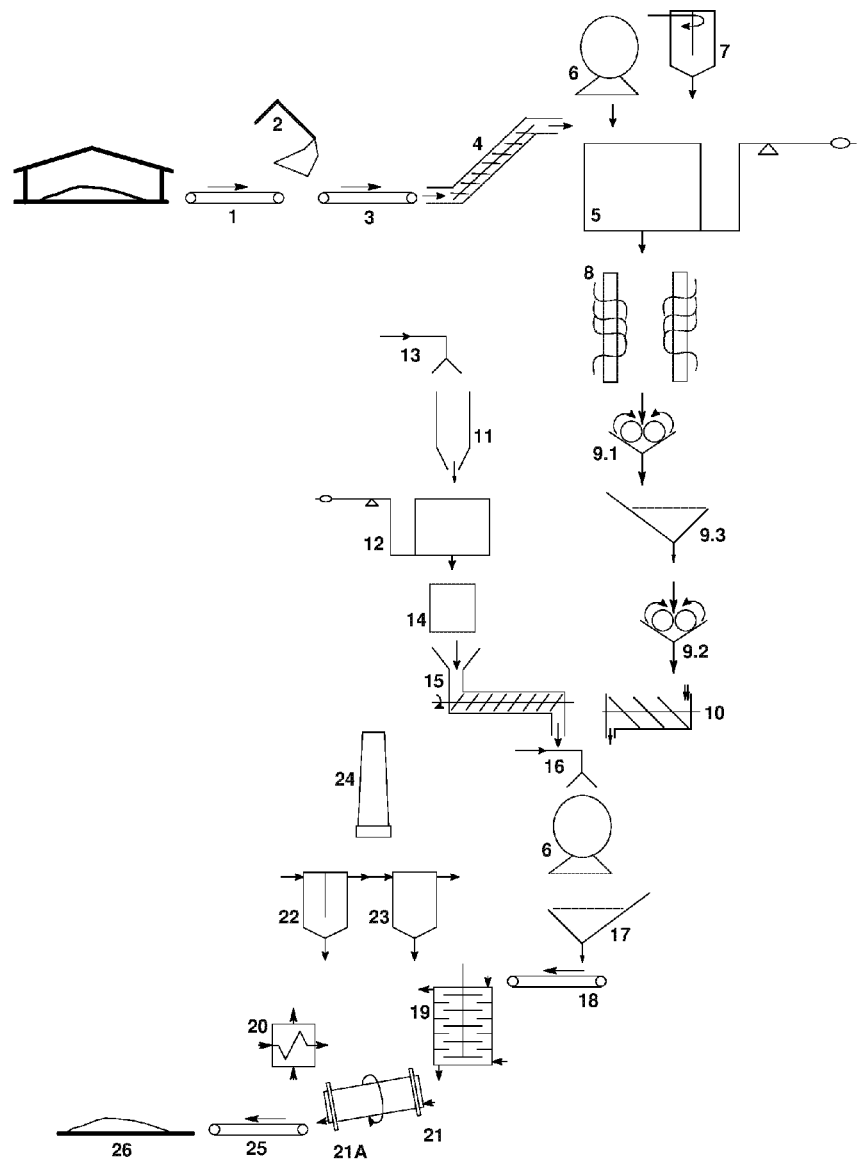

The invention is shown in an embodiment in the drawings, in which:

FIG. 1 shows a schematic block diagram of a method for producing a lightweight ceramic aggregate according to the invention, and FIG. 2 shows a schematic diagram of a system for producing a lightweight ceramic aggregate according to the invention.

A method for producing a lightweight ceramic aggregate, particularly coal ash, according to the invention is characterized in that a raw material mixture, of the total moisture content preferably below 20% by weight, consisting of power station ashes originating from combusting coal, or ashes from combusting coal in a mixture with biomass ash, or ashes from co-combusting biomass with coal and phosphogypsum in an amount of up to 50% by weight, taken from dumps and/or from direct dump from a power station or a heat and power station, the raw materials from the dumps preferably being heated up in winter by a mixture of atmospheric air and exhaust gases from the step of burning and sintering, with a content of non-burnt coal above 6% by weight, agglomeration promoting agents like silty non-organic materials, preferably bentonite, preferably in an amount of up to 4% by weight, clay preferably of up to 6% by weight, organic waste materials like used paints and lacquers, after-fermentation sludge in an amount preferably of up to 10% by weight, and after-coal mining waste materials in an amount preferably up to 50% by weight, the mixture being completed with dust separated from exhaust gases produced during the step of burning and sintering, is fed to preferably at least one of two or more granulating disks, or in a cascade-type manner to at least two granulating disks, where it is sprayed with water, preferably in a form of a mist, to the total moisture content preferably below 30% by weight. Next, the screened fraction of grains of the granularity of preferably 6-30 mm, is subjected to counterflow drying in the heat of a mixture of the atmospheric air and cooled exhaust gases from the step of burning and sintering, the cooled exhaust gases having the temperature below the ignition temperature of the granulated material. The dried granulated material is subjected to burning and sintering in a co-flow rotary oven with radial air supply, with filling the oven with the granulated material preferably above 50% of its volume without adding any external fuel. Next, the burnt granulated material is subjected to a non-membrane atmospheric air cooling process in a crossed arrangement in a cooling bed, preferably of a transporter or grate type. Cold air is fed to the cooling bed into its specific cooling zone in such an amount that its mixture with the exhaust gases led out from the oven is suitable for drying the granulated material in the drier, for heating up, particularly in the winter, the raw materials taken from the dumps, and for feeding the nozzles radially delivering hot gases into the rotary oven. Finally, the granulated material cooled down preferably to a temperature below 100° C. is transported to the storage yard for the final product, where the aggregate is sorted into trade fractions, round aggregate, and the overgrains, which, after crushing and re-sorting is a crushed aggregate.

Preferably, in winter, ashes and/or phosphogypsum from dumps are heated up by a mixture of atmospheric air and exhaust gases from the step of burning and sintering.

The major portion of the hot exhaust gases from the burning and sintering step is fed to a heat exchanger and, after de-dusting in a filter, preferably a cloth filter dust collector, is led out to the chimney, the recovered heat being utilized for external needs, including sanitary, agriculture, industry, and most preferably for producing electric energy.

The system for producing a lightweight ceramic aggregate, particularly from coal ash according to the invention is composed of a transporting-sorting device 1 acquiring coal ashes or ashes from combusting coal mixed with biomass ashes, or ashes from co-combusting biomass, coal and phosphogypsum preferably in an amount of up to 50% by weight, from dumps, the device 1 cooperating with an excavator 2, preferably a multibucket excavator, which, by means of a weighting conveyor 3, transfers the batch material to a transporting device, preferably a paddle-type device with a heating functionality, also playing a role of a stirrer and an initial shredder 4, from where the mixture is transported to an intermediate container 5 with a weighting functionality by means of a vertical conveyor, preferably a screw conveyor with a transporting belt without the central shaft, where also the stream of the separated granulated material is directed from granulators 6 as well as the dusts from the dust collector 7, preferably a cyclone, removed from the stream of the gases heating up the batch in the transporting conveyor 4, preferably a paddle conveyor. Further, the mixture of the raw materials is fed, through a magnetic separator 8 of metallic contaminants, two-stage crushing assembly 9, preferably composed of two drum crushers, correspondingly 9.1 and 9.2, and an inter-operation one board relieving screen 9.3, to a stirrer 10, preferably a screw stirrer, preferably a two shaft stirrer, and completed with agglomeration promoting agents taken from storage silos 11 and weighted in the weighting conveyor 12 and then moistened by water supply 13. Further, through a moisture content meter 14, by means of a dosing conveyor 15, preferably a screw conveyor, the mixture enters a system of granulators 6, preferably disk granulators, on the surface of which it is moistened by mist from water nozzles 16, and then, after overflowing over the side walls of the disks of the granulators 6, it is directed to a screen 17, from which overgrains and undergrains are returned to the intermediate container 5 whereas the grains of appropriate size are transported by a distributing conveyor 18 to the highest shelf of the drier 19, preferably a known counterflow drier with movable shelves according to P393175, wherein the drying agent are exhaust gases from the burning and sintering process in the sintering device 21, cooled down by atmospheric air in the cooling bed 20. Further from the drier 19 the grains are led to the chute of the sintering device 21, preferably a known rotary oven according to patent 196842, from where they pour over a pile-up baffle 21A of the sintering device 21 to the cooling bed 20 and further through the final conveyor 25 to the storage yard 26.

From wet, dusty, cold gases leaving the drier 19 water is condensed in a condenser 22 and wholly returned to the process of moistening the raw material mixture in the stirrer 10, preferably a two-shaft stirrer and to granulators 6, whereas dusts are separated in the dust collector 23, also wholly returned to the process and directed through a storage silo to the stirrer 10, preferably a two-shaft stirrer, whereas the cleaned gases enter the chimney 24.

The invention claimed is:

1. A method for producing a lightweight ceramic aggregate, comprising:
   creating a raw material mixture comprising:
      an amount of a non-burnt coal above 6% by weight;
      an amount of a phosphogypsum of less than 50% by weight;
      an amount of a fermented sludge of no greater than 10% by weight;
      an amount of an agglomeration promoting agent between 4% and 6% by weight, said agglomerating promoting agent comprising at least one of a non-organic silt and clay;
      a total moisture content below 20%; and
      a dust separated from a cooled exhaust gas of a co-flow rotary oven;
   granulating the raw material mixture while spraying the raw material mixture with water;
   screening the granulated raw material mixture;
   counterflow drying the screened granulated raw material mixture with a mixture of atmospheric air and the cooled exhaust gas, the cooled exhaust gases having a temperature below an ignition temperature of the screened granulated raw material mixture;
   burning and sintering the dried granulated raw material mixture in the co-flow rotary oven with a radial air supply, without adding any external fuel to the oven;
   cooling an exhaust gas from the oven to form the cooled exhaust gas;
   subjecting the burnt granulated raw material mixture to a non-membrane atmospheric air cooling process in a crossed arrangement in a cooling bed, wherein cold air is fed into a cooling zone of the cooling bed in such an amount that a mixture of a cold air exiting the cooling bed and the exhaust gas from the oven is suitable for use in at least one of the counterflow drying, heating at least one of the non-burnt coal and the phosphogypsum, and the rotary oven.

2. The method for producing a lightweight ceramic aggregate according to claim 1, wherein at least one of the non-burnt coal and the phosphogypsum are heated with the mixture of the cold air exiting the cooling bed and the exhaust gas from the oven.

3. The method for producing a lightweight ceramic aggregate according to claim 1, further comprising:
   feeding a portion of the exhaust gas from the oven to a heat exchanger to recover heat;
   filtering the exhaust gas from the oven leaving the heat exchanger; and
   letting the filtered exhaust gas out a chimney.

4. A system for producing a lightweight ceramic aggregate, comprising:
   an excavation pathway comprising:
      an excavator;
      a transporting-sorting device acquiring a batch material from the excavator;
      a first weighting conveyor receiving the batch material from the transporting-sorting device;
      a transporting device receiving the batch material from the first weighting conveyor, the transporting device capable of heating the batch material with a stream of gas, shredding the batch material, and stirring the batch material;
      a dust collector;
      an intermediate container receiving the batch material from the transporting device and receiving a dust from the dust collector;
      a magnetic separator of metallic contaminants, the magnetic separator receiving a granulated material and the dust from the intermediate container;
      a two-stage crushing assembly comprising an inter-operation one board relieving screen; and
      a stirrer receiving a screened material from the two-stage crushing assembly;

a stored material pathway comprising:
  a storage silo;
  a second weighting conveyor receiving a stored material from the storage silo;
    a water supply moistening the stored material received by the second weighting conveyor;
    a moisture content meter capable of measuring the moisture content of the stored material; and
    a dosing conveyor receiving the stored material downstream of the moisture content meter; and
  a mixture pathway comprising:
    a system of granulators comprising a water nozzle, the system of granulators receiving batch material from the stirrer of the excavation pathway and the stored material from the dosing conveyor of the stored material pathway;
    a screen receiving a granulated material from the system of granulators and capable of providing overgrains and undergrains to the intermediate container of the excavation pathway;
    a distributing conveyor receiving the granulated material from the screen;
    a drier receiving the granulated material from the distributing conveyor;
    a sintering device comprising a baffle and a chute, the sintering device receiving the granulated material from the drier and providing exhaust gases to the drier;
    a cooling bed capable of cooling material received from the drier with atmospheric air, the cooling bed receiving a sintered material from the baffle of the sintering device;
    a final conveyor receiving a cooled material from the cooling bed.

5. The system for producing a lightweight ceramic aggregate according to claim 4, further comprising:
  a condenser receiving a dust containing gas from the drier of the mixture pathway, providing extracted moisture to the stirrer of the excavation pathway, and providing a dried gas to the dust collector of the excavation pathway; and
  a chimney receiving a cleaned gas from the dust collector of the excavation pathway.

6. The method for producing a lightweight ceramic aggregate according to claim 1, wherein a portion of the amount of non-burnt coal is obtained from at least one dump ash, after-coal mining waste and power station ash.

7. The method for producing a lightweight ceramic aggregate according to claim 1, wherein the raw material mixture further comprises an amount of after-coal mining waste of less than 50% by weight, the amount of after-coal mining waste providing a portion of the amount of non-burnt coal.

8. The method for producing a lightweight ceramic aggregate according to claim 1, wherein the raw material mixture further comprises an amount of dump ash of greater than 6% by weight, the amount of dump ash providing a portion of the amount of non-burnt coal.

9. The method for producing a lightweight ceramic aggregate according to claim 1, wherein the raw material mixture further comprises an amount of power station ash of greater than 6% by weight, the amount of power station ash providing a portion of the amount of non-burnt coal.

10. The method for producing a lightweight ceramic aggregate according to claim 1, wherein a portion of the amount of the agglomeration promoting agent comprises bentonite.

11. The method for producing a lightweight ceramic aggregate according to claim 1, wherein a portion of the amount of the fermented sludge is derived from an organic waste material comprising at least one of a paint and a lacquer.

12. The method for producing a lightweight ceramic aggregate according to claim 1, wherein granulating the raw material mixture comprises feeding the raw material mixture through at least one granulating disk.

13. The method for producing a lightweight ceramic aggregate according to claim 1, wherein granulating the raw material mixture comprises feeding a cascade of the raw material mixture through at least two granulating disks.

14. The method for producing a lightweight ceramic aggregate according to claim 1, wherein spraying the raw material mixture with water increase the total moisture content to below 30% by weight.

15. The method for producing a lightweight ceramic aggregate according to claim 1, wherein screened granulated raw material mixture has a granularity of 6-30 mm.

16. The method for producing a lightweight ceramic aggregate according to claim 1, wherein the co-flow rotary oven comprise a volume, and
  wherein burning and sintering the dried granulated raw material mixture comprises filling at least 50% of the volume of the co-flow rotary oven with the dried granulated raw material mixture.

17. The method for producing a lightweight ceramic aggregate according to claim 1, wherein the cooling bed is a transporter type cooling bed.

18. The method for producing a lightweight ceramic aggregate according to claim 1, wherein the cooling bed is a grate type cooling bed.

* * * * *